Nov. 7, 1961 P. CHADENSON 3,007,333
GAS ANALYZER APPARATUS

Filed April 29, 1959 2 Sheets-Sheet 1

INVENTOR.
Pierre Chadenson
BY Webb, Mackey & Burden
HIS ATTORNEYS

United States Patent Office 3,007,333
Patented Nov. 7, 1961

3,007,333
GAS ANALYZER APPARATUS
Pierre Chadenson, Caluire, France, assignor to Societe d'Electro-Chimie d'Electro-Metallurgie et des Acieries Electriques d'Ugine, Paris, France, a corporation of France
Filed Apr. 29, 1959, Ser. No. 809,853
Claims priority, application France May 9, 1958
6 Claims. (Cl. 73—27)

This application relates to gas analyzer apparatus. More particularly, it relates to a gas analyzer for making a comparison of the thermal characteristics or properties of a known carrier gas with and without some proportion or traces of an included gas therein. The components in a mixture exhibit a marked difference in value (compared to the carrier alone) both as to specific heat and thermal conductivity when tested by the present sensitive apparatus and thus highly reliable indications pertaining to the included gas present are available.

For this purpose, a heat emitting body of relatively small mass is introduced into each of the mixed and unmixed gaseous media and the ultimate temperature which each such body sustains is a function of the relative thermal properties of the respective media. If the relative proportions of the carrier and unknown constituent are known, then the unknown constituent can be readily identified whereas if already known, then the specific proportions of the gas mixed with the carrier can be readily determined. In either case, elevating the temperature of the hot body produces a proportionate increase of the heat gradient between the gaseous medium and the hot body and thus the thermal properties of the former are brought more in evidence for measurement. When the gas is a trapped sample, it is the heat conductivity thereof which establishes the ultimate temperature of that hot body whereas when the gas is allowed to flow in a stream in which the body is immersed, the property thereof which is determinative of the body's temperature consists of the specific heat of the gaseous medium.

Because of the convenience and accuracy of measuring apparatus making use of electrical methods, it has been the past practice to employ a temperature-sensitive resistance element as the heat emitting body in the gas and to keep it under a constant state of energization while in the trapped body or stream of that gas. A stable conductive material with fairly high positive heat coefficient has been usual and wires of metal such as platinum, nickel and their alloys were preferably used as resistor wires. However, the corrosive life of the wire is limited, particularly when higher temperatures are necessary for the proper sensitivity and not only does the gas composition tend to change or decompose in certain instances when exposed to the bare hot wire but also the wires are shortlived because they either deteriorate or tend to burn out. Traces of hydrogen gas are particularly damaging to a hot wire because of the reducing characteristics of this gas.

In place of the temperature-sensitive resistance wires, thermistors have been suggested as a substitute because of the well-known fact that the highly resistive beads of oxide in this form of temperature-sensitive resistor exhibit a temperature coefficient which is about ten times higher than that of the most sensitive metallic wires. However, when thermistors are supplied with a moderate amount of current so as to be self-heating due to their internal resistance, they lose a substantial part of their uniform performance at the higher temperatures generated and thus, in practice, they have been restricted to a use in which their heat gradient with respect to a medium is low due to the somewhat low, safe operating temperature therefor.

The analyzer apparatus of the present invention employs thermistors in a way materially reducing if not substantially overcoming the foregoing difficulties. More specifically, each trapped gas cell or flow chamber in this apparatus contains a first thermistor which is overheated so as to run hot and a physical companion thermistor which is in closely spaced relation thereto and to the gas. The companion thermistor is supplied with only a slight amount of current which at the ambient temperature would enable the companion thermistor to run cool and which at the same time maintains it in a very stable and sensitive portion of its operating range. Inasmuch as thermistors have a so-called negative resistance characteristic (i.e., negative temperature coefficient), there is a relatively high voltage drop across the cooler running ones of the present thermistors enabling accurate temperature measurements to be made when they are externally heated by the hot thermistor. A bridge circuit in which they are connected can, therefore, be accurately employed as a comparative means for detecting temperature variations in the hot body thermistors. In this way, the thermal conductivity or the specific heat or both can be accurately analyzed for the gaseous media, enabling the included gas or its proportions to be determined.

Further features, objects and advantages will either be specifically pointed out or become apparent when for a better understanding of the invention, reference is made to the following description taken in conjunction with the accompanying drawings, in which:

FIGURES 1 and 2 respectively are end elevational and longitudinal cross-sectional views of a symmetrical temperature cell in which the carrier gas and its mixture with another gas are introduced at opposite sides and which embodies the present invention;

Figure 1:
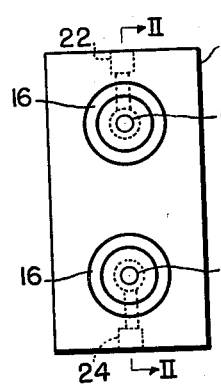
Figure 2:
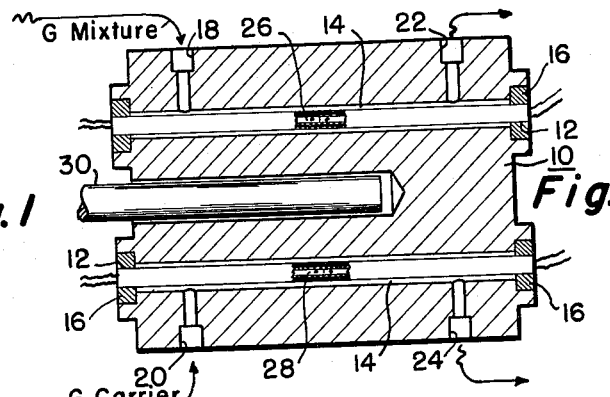

More particularly in the drawings, a temperature cell 10 is shown in FIGURES 1 and 2 consisting of a rectangular block of metal formed with two symmetrically located, through bores in which there fits a pair of accurately gauged metal tubes 12 with an annular space therebetween to provide respective upper and lower parallel passages 14. The cell block is counterbored at each end of the respective passages 14 to receive individual thick washers 16, each of which receives the tube 12 at that end for accurate centering of the latter. Each washer 16 is made of metal which, due to a continuous fused metal or brazed continuous joint made about its outer and inner peripheral junctures with the cell block and with the tube, renders each of the passages 14 gas-tight to the outside atmosphere.

The passages 14 are intersected by transverse inlets 18 and 20 respectively by which the upper and lower passages are charged respectively with the gaseous mixture to be analyzed and with a carrier or reference gas. The former gas leaves through a transverse outlet 22 intersecting the upper passage in the cell and the carrier gas leaves through a similar transverse outlet 24; and when once charged, the gaseous media within these passages can be analyzed as a static medium, if desired, or as a flowing medium if the circulation is made continuous, preferably the latter.

A first pair 26 of temperature-sensitive resistance elements, hereinafter referred to as thermistors, is carried inside the tube 12 in the upper passage and a second pair of thermistor elements 28 is contained in the tube in the lower passage, each of these elements being identical to the others. The geometric form chosen for their arrangement and for the location and size of the passages within the block 10 make the temperature-sensitive measurements of the present apparatus independent of the gas flow between zero and five liters per hour. A conventional sensing head 30 is inserted in a central cavity of the cell 10 in order to continuously register the temperature of the metal block. With the use of silver solder at the joints, the cell 10 will satisfactorily work to an operating temperature of about 650° C. provided, of course, the thermistor elements selected do not unnecessarily deteriorate.

From current supplied to one of the thermistor elements in each of the pairs 26 and 28, they emit heat and stabilize at a temperature dependent upon the characteristics of the gases surrounding them. Their temperature is measured by a conventional bridge circuit whereby the resistance readings produced in the upper passage 14 containing the mixture is electrically compared to the resistance and consequently temperature registered in the lower passage containing the carrier gas; and in this manner, the mixture can be carefully analyzed.

Figure 3:
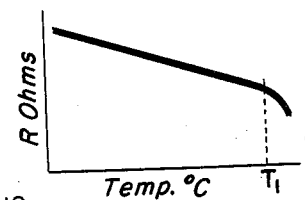
FIGURES 3 and 4 are graphs of the self-heating operational performance of the temperature-sensitive resistant elements hereof on basis of resistance variations with temperature and voltage variations with current, respectively.

As stated, a thermistor exhibits a negative temperature coefficient and the graph of FIGURE 3 illustrates the characteristic behavior of these elements. According to the graph, their resistance shows a fairly uniform variance with temperature increases at the lower temperatures under a self-heated operation; i.e., they are imperceptibly or at most only slightly warmer than ambient temperature at the lower rates of energization. However, at and above a temperature $T_1$ as indicated on the graph, thermistors are generally prohibitively non-linear in their temperature resistance characteristic; and under a pure self-heating operation where no artificial heat is externally added, this instability temperature is commonly reached as low as approximately 150° C. Therefore, their accuracy rapidly approaches a point beyond which it is not too reliable.

Figure 4:
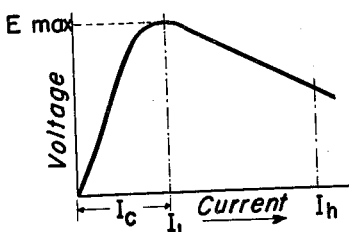

The graph of FIGURE 4 shows a voltage-current performance characteristic which has been observed on thermistors. It is seen that beginning with the lowest ranges of current $I_c$ for cool operation or in other words, where the thermistor is substantially non-self-heating, the voltage drop across the thermistor increases with positive slope up to a maximum voltage $E_{max}$. At and above the current flow $I_1$ corresponding to maximum voltage $E_{max}$ the values of the current and the wattage ($I^2R$) dependent thereupon are such that the thermistor becomes decidedly self-heating and a general heating current of value $I_h$ therethrough renders it a heat radiating body. Moreover, it has been found that when a thermistor is supplied with current of a value $I_h$ in the heating current range which occurs on the negative slope portion of the curve, a considerable instability of operation is encountered and when it is connected in a customary bridge circuit, for instance, the bridge balance tends to be upset in a irreversible way so that accurate measurements became tedious if not impossible. Practice in the past, therefore, has been to relegate the operation of thermistors in general purpose applications to the positive slope portion of their performance curve—that is to say, supply them with current in the range $I_c$ of FIGURE 4, where $I_c$ is a slight energizing current sufficient of itself to cause the thermistor to run cool in its operation but no more. As above indicated, the present invention in its specific application to a gas analyzer has made reliable, high temperature operation possible.

Figure 5:
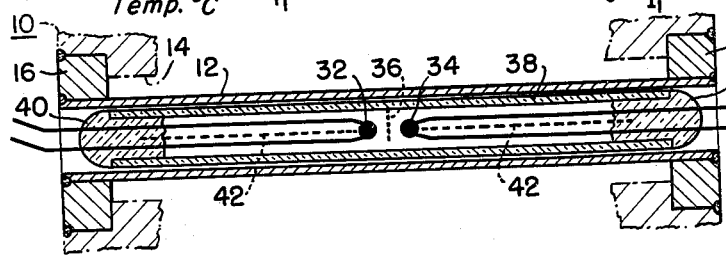
FIGURE 5 is an enlarged view of a detail of the longitudinal sectional view of FIGURE 2.

In FIGURE 5, each of the pairs of thermistors contained within the tubes 12 consists of one bead-shaped thermistor 32 which is supplied with a heating current $I_h$ as an electrically heated body acting as heater for an unheated companion thermistor 34 which is supplied merely with a slight energizing current $I_c$ which by itself would enable the thermistor to run cool in its operation. A thin disc of mica 36 electrically insulates the two thermistors 32 and 34 from one another, these thermistors being sealed within a common cylindrical glass envelope 38 that is press-fitted as a core within the hollow interior of the tube 12. The tube 12 is open at both ends for ready insertion and removal of replacement glass envelope cores therein irrespective of whether the cell is in operation or not and thus there is no way during replacement while a test is in progress to contaminate the gas within the adjacent sealed passage 14 about the tube 12. Two electric leads for each of the thermistors pass through customary fused glass seals 40 at opposite ends of the envelope 38 and mica tape 42 is provided therein to electrically insulate the leads from one another.

Following is an example of the physical dimension and materials used in the cell and its components shown in FIGURES 1, 2 and 5:

| | |
|---|---|
| Cell block | stainless steel. |
| Tubes 12 | stainless steel. |
| Envelope 37 | glass. |
| Thermistors 32, 34 | 4,000 ohms resistance (ambient). |
| Outside dimensions cell 10 | 66 mm. long x 48 mm. deep x 25 mm. thick. |
| Through bores in cell 10 | 3.5 mm., I.D. |
| Tubes 12 | 2.2 mm., O.D. |
| Wall thickness of tubes 12 | 0.1 mm. |

Figure 6:
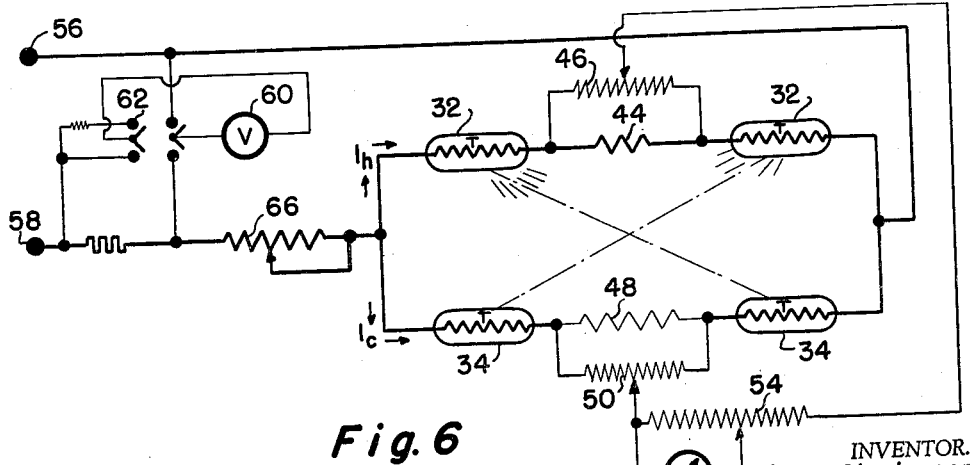
FIGURE 6 is a schematic diagram of an electrical bridge measurement system.

The pairs 26 and 28 of thermistors are electrically connected together in a balanced Wheatstone bridge circuit schematically shown according to FIGURE 6. However, instead of the heater thermistor 32 of each pair being connected to its companion element 34, it is noted that one of the heater thermistors 32 is inserted in one leg of the upper branch of the bridge, whereas its physical companion element 34 is in a leg of the bridge completing the lower branch thereof. Similarly, the other companion thermistor 34 occupies a leg of the lower branch whereas its heater thermistor 32 is in the leg completing the upper branch of the bridge, thus establishing a system of cross connections. A cross connection resistor 44 which interconnects the two heater thermistors 32 forms a path of low resistance to the heating current $I_h$ necessary to bring these thermistors to the proper hot body operating temperature. A high resistance precision potentiometer 46 is connected in parallel to the resistor 44, with the latter enabling the thermistors 32 to overheat.

A current limiting resistance 48 which cross connects the thermistors 34 forms a high resistance path therebetween such that at all times the current circulating therethrough is limited to a cool operating value $I_c$. Another precision potentiometer 50 is connected electrically in parallel to the resistor 48 and the sliders between these two high resistance potentiometers 46 and 50 lead to the meter-attachment voltage terminals of the bridge; these terminals, indicated schematically by unnumbered black dots, are connected to opposite sides of a galvanometer instrument 52 by which it can be readily determined when the sliders and hence when the balance of voltage have been accurately brought to the zero setting. A voltage divider 54 has a sliding contact enabling the galvanometer 52 to be accurately adjusted for the proper sensitivity to the voltage differential between the potentiometer sliders.

Alternating or direct current is supplied to opposite ends of the bridge of FIGURE 6 through a pair of input terminals 56 and 58; a shunt type voltmeter 60 disposed there-adjacent is electrically connectable through multiple contacts 62 for keeping an accurate measurement of the bridge input voltage and input current. The latter is regulated through a rheostat 66 inserted between one terminal 58 and the corresponding end of the bridge.

In known way, the bridge of FIGURE 6 is brought into electrical balance under a steady state operation with preselected values of moderate and relatively slight current flowing in the respective upper and lower branches of the bridge. Then samples of a mixture with the carrier or reference gas and the carrier gas alone are introduced into the conduits 14, whereupon the bridge is rebalanced by appropriate moving of the sliders with their resulting position and the voltage differential which is thus overcome being a direct function of the cooling which has occurred due to the character of the gas in the different passages.

During the foregoing operation, the heater thermistors 32 which are self-heating due to the current flow therethrough, are effective to heat the companion thermistor 34 and because of their physical proximity, the variations in temperature of the thermistors 34 vary accurately in accordance with the temperature of the heater thermistors 32. In this way, the former thermistors 34 are used for detecting temperature variations of the heaters which in turn depend directly upon the character of the gas surrounding the metal tubes 12 and the glass envelope 38 of FIGURE 5. Heat readily transfers between the latter by conduction due to their tight fit. Of course, proper calibration of the potentiometers in the bridge is essential to enable each mixed sample of gas to be properly analyzed.

The resulting stability and accuracy is accounted for in the fact that the sensing thermistors 34 are being operated in a range at the lower end of their performance curve where their resistances are relatively high, so that slight variations in resistance give substantial readings thus accounting for marked variations in the voltage drop thereacross which can be readily measured.

Adjusting the bridge to the zero point is relatively easily carried out because of the stabilized range of operation selected for these thermistors and there is no appreciable thermal reaction present in the bridge introducing an irreversible condition of instability. Moreover, due to smallness of the gas-filled passages herein provided, the time response of the instant apparatus is excellent, being approximately five seconds. The susceptibility of the readings to variations of supply voltage are from $\frac{1}{10}$ to $\frac{1}{20}$ of the variation detected compared to a wire cell type of analyzer. Moreover, any local overheating of the gas within these small passages is limited to approximately 30° C. rise.

Figure 7:
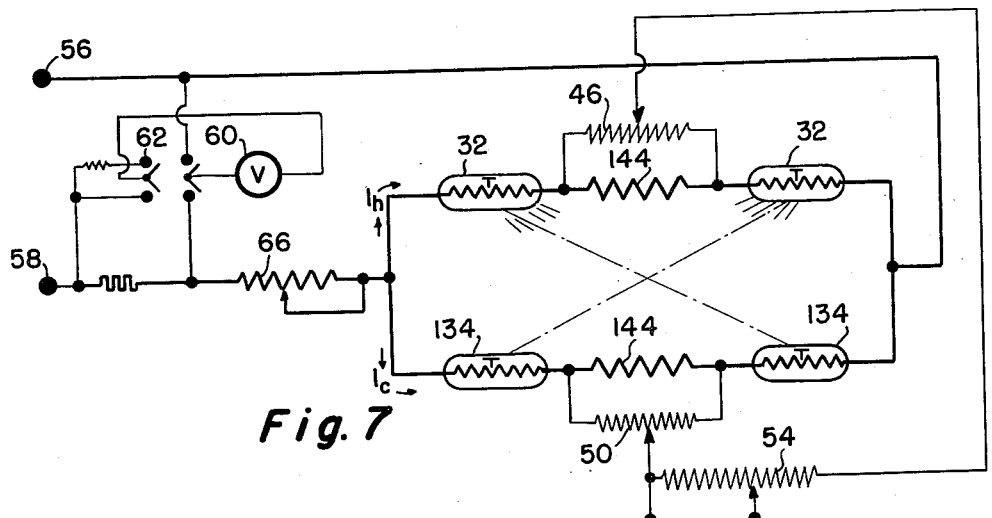
FIGURE 7 shows a modified form of the bridge system.

A modified form of the bridge of foregoing FIGURE 6 is shown in FIGURE 7 in which like reference numerals are generally employed. The circuits are, in fact, the same except as specifically pointed out hereinafter. The heater thermistors 32 of FIGURE 7 are interconnected by a low value resistor 144 in their cross connection which forms a path of low resistance to the heating current necessary to bring the heaters to the proper hot body radiating temperature. However, another low resistor 144 is likewise used in the lower branch of the circuit to form a low resistance path interconnecting a pair of sensing thermistors 134 which are heated by the heater thermistors. However, the thermistors 134 differ from the previously discussed thermistors in that they offer an exceedingly high internal resistance to the flow of current and thus the flow of current through the lower branch resistor 144 is kept low. This current of value $I_c$ which is circulated therethrough maintains the high resistance thermistors 134 so that they operate only within the positive slope range of the voltage current curve of FIGURE 4 and their normal ambient resistance is so inherently high as to permit them to retain exceedingly sensitive accuracy when the temperature of the cell 10 measured by the head 30 of FIGURE 2 is raised by the heaters as high as approximately 350° C.

Following is an example of the comparative resistances of thermistors selected for the circuit of FIGURE 7:

Thermistors 32 _____ 4,000 ohms resistance at ambient temperature.
Thermistors 134 _____ 0.1 megohm at ambient temperature.

Figure 8:
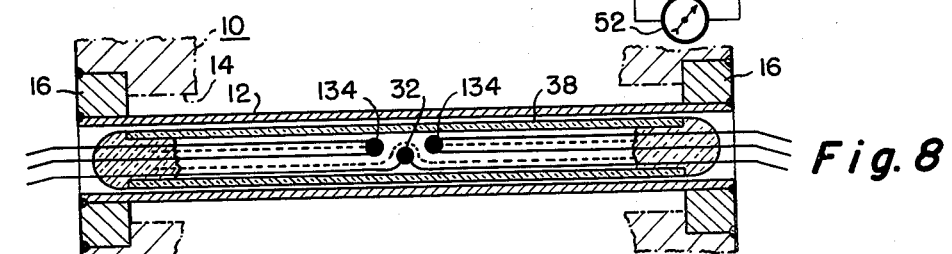
FIGURE 8 shows a modification of the detail of FIGURE 5.
Figure 9:
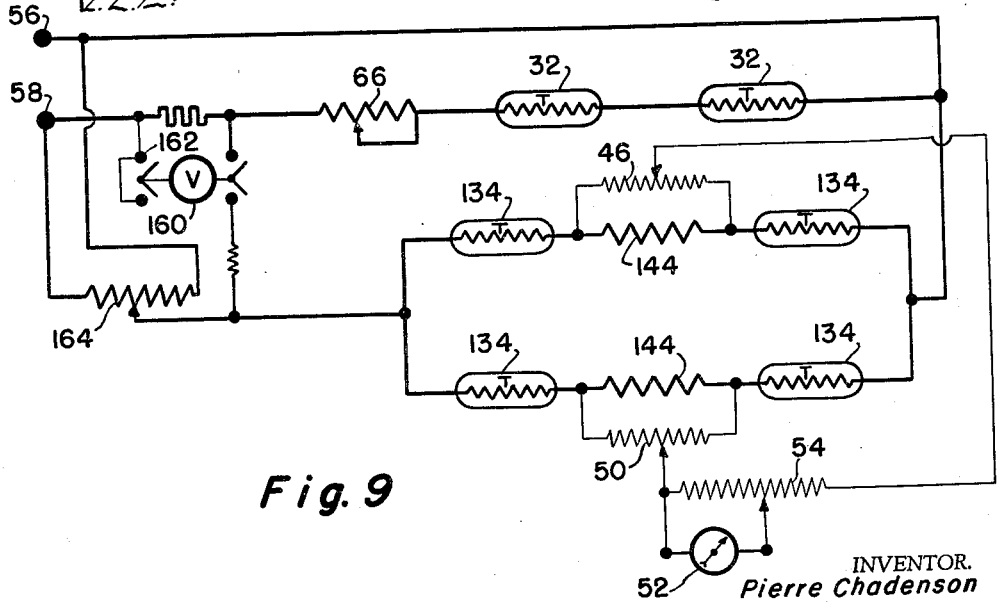
FIGURE 9 shows a modified form of bridge system for use with the detail of FIGURE 8.

FIGURES 8 and 9 illustrate a slight modification in form of the system of FIGURE 7 whereby double the sensitivity is achieved by employing three thermistors sealed in each of the glass envelopes 38. The heater thermistor 32 in each envelope occupies a position of closely spaced juxtaposition to the two temperature sensing thermistors 134 disposed one on each side thereof, and having high internal resistance. With respect to its heater thermistor 32, one companion element 134 in one of the envelopes is electrically included in a leg in the upper branch of the bridge circuit, whereas the second companion element 134 therewith is included in the leg completing the lower branch. Similarly, the other heater thermistor 32 has one of its companion elements 134 included in the leg completing the upper branch of the bridge circuit, whereas the second companion element 134 is cross connected so as to be in the first leg of the lower branch of the bridge. A rheostat 66 in circuit with the heater thermistors 32 is adjusted for moderate current so as to overheat them in a branch separate from the actual bridge circuit. Except for a voltage divider 164 which is inserted to regulate the bridge and for further slightly different connections 162 for the voltmeter 160 to control the current and voltage in the bridge, schematic FIGURE 9 is generally similar to schematic FIGURE 7. The respective resistors 144 connecting the thermistors 134 in the upper and lower branches of the circuit have a low value so as to form a low resistance path, whereas the internal resistance of the sensing thermistors is of the equal order of high magnitude as discussed in connection with the thermistors 134 of FIGURE 7.

The voltage variations across these very high resistance thermistors 134 is cumulative due to their cross connections illustrated, and their sensitivity or accuracy is thus doubled when measured by the bridge.

The temperature level employed for purposes of the foregoing operation exceeds by far the usual operating temperature for thermistors and equals or exceeds the usual operating temperature for temperature-sensitive resistance wires, all without loss of the high temperature coefficient advantage afforded by thermistors compared to resistant wires. Moreover, the sensitiveness in terms of measurable voltage at the bridge based upon the same supply voltage thereto is 4 to 20 times better with cells having the 4 or 6 thermistors of the preceding embodiments in comparison to wire cells of the prior art type when overheated to temperatures in excess of 100° C.

It is an important advantage of the present invention that neither the gas is contaminated by the overheated thermistors nor vice versa. The present double sheathing by a metal tube and by a glass envelope about the thus hermetically sealed thermistors protects them from chemical attack to which, because of their composition as beads of metal oxide, they would be continually susceptible.

Variations within the spirit and scope of the invention described are equally comprehended by the foregoing description.

I claim:
1. A temperature cell having a plurality of discrete receiving passages therein for samples of a carrier gas both with and without an inclusion gas therewith, pluralities of temperature-sensitive thermistor elements individual to the receiving passages and received thereby, electrically conductive lead means affixed to said thermistor elements to introduce current to maintain each element in an operating condition so as to be relatively non-self-heating in its operation, each plurality of said temperature-sensitive thermistor elements having an indi- vidual overheating means fixed in closely spaced adjacency with respect thereto in the gas-filled passage for the physical addition of heat to the latter and simultaneously to the thermistor elements in said plurality, said heating means consisting of overheated thermistors constituting the sole means for overheating the temperature-sensitive thermistor elements.

2. A system for utilizing a Wheatstone bridge circuit to analyze gases wherein the bridge presents voltage terminals for attachment of a measuring meter, comprising a temperature cell having a plurality of discrete receiving passages therein for samples of a carrier gas both with and without an inclusion gas therewith, a set of circuit receiving thermistors in each cell passage and each consisting of a heater thermistor and at least one companion thermistor heated thereby, means comprising resistors constituting cross connections between like thermistors of each set to form said bridge in a manner whereby said companion thermistors are paired together to register a ratio of relative resistances corresponding to a temperature differential produced in the heater thermistors due to the differences of the gaseous media, and electrical meter means connected to the voltage terminals of said Wheatstone bridge for completing the circuit to compare the relative temperature measured by said companion thermistors whereby the reading from the carrier gas alone provides a reference for measurement of the gas composition difference due to the inclusion gas with the carrier.

3. A system according to claim 2 wherein the cross connection resistors are of like value.

4. A system according to claim 3 wherein a plurality of companion thermistors is included with the heater thermistor of each set to introduce a cumulative voltage reading for high accuracy, the aforesaid companion thermistors of each set being included in different branches of said bridge from one another.

5. A system according to claim 2 wherein the cross connection resistors are of different values so as to form a path of low resistance in circuit with the heater thermistors enabling moderate heating current to bring them to the proper hot body operating temperature, and forming a current limiting, high resistance path in circuit with the companion thermistors which are therefore substantially solely heated by the heater thermistors.

6. Measuring or detecting device of gases in a gaseous mixture, by comparison of the thermal conductivity of this mixture with that of a reference gas by means of thermistors placed in circuits with such gases, comprising a metal body provided with two passages, one communicating with the circuit of the gas to be analyzed, and the other with the circuit of the reference gas, in each of which two passages there being supported a thin metal tube cooperating therewith to provide an annular volume through the two passages, and being symmetrical and gas tight, in each of which metal tubes there being supported an electrically insulated tube containing at least two thermistors, electrically insulated one from the other, and a temperature-measuring device including said thermistors, formed by a resistance bridge fed by current in which a first group of thermistors is disposed in different insulating tubes and fitted in series with a low resistance for supplying heat, while a second group of thermistors also disposed in the respective different tubes and fitted in series with a strong resistor, does not supply heat, said second group placed near the first and heated, giving voltage variations to be measured by the bridge and thus serving to detect the variations of temperature of the first group's thermistors.

References Cited in the file of this patent

UNITED STATES PATENTS

| | | |
|---|---|---|
| 2,329,840 | Keinath | Sept. 21, 1943 |
| 2,565,230 | Hebler | Aug. 21, 1951 |
| 2,732,710 | Richardson | Jan. 31, 1956 |
| 2,768,069 | Thompson | Oct. 23, 1956 |

FOREIGN PATENTS

| | | |
|---|---|---|
| 869,429 | Germany | Mar. 5, 1953 |

OTHER REFERENCES

Article: "Precision Thermal—Conductivity Gas Analyzer Using Thermistors," by R. E. Walker and A. R. Westenberg, The Review of Scientific Instruments, volume 28, No. 10, October 1957, pages 789, 792. (Photostat in 73—27.)